Nov. 3, 1964     B. N. PALM     3,154,959
VARIABLE SPEED DRIVE
Filed Aug. 27, 1962
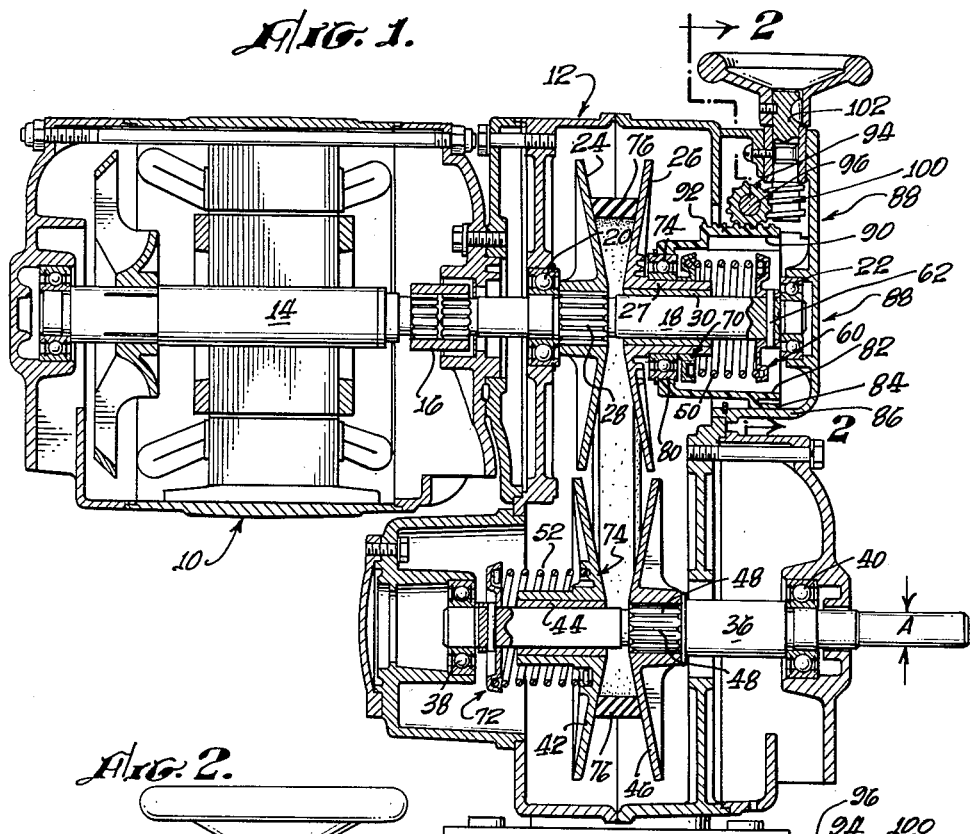
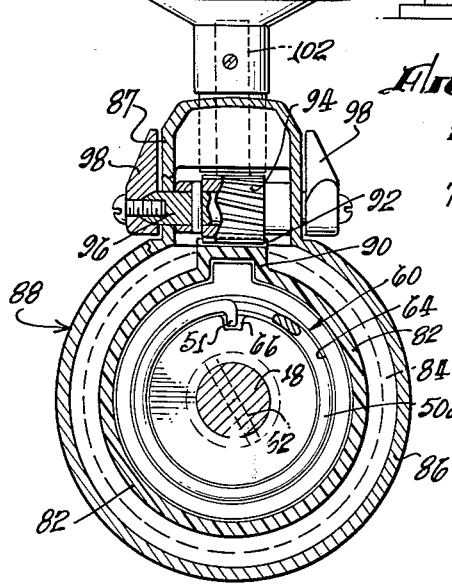
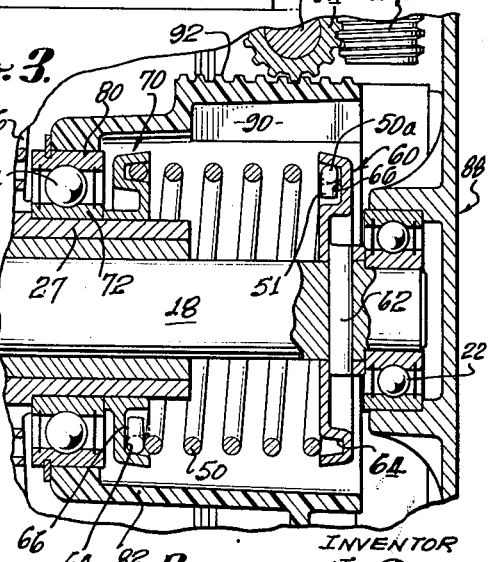
INVENTOR
BERNHARD N. PALM,
By Bacheller & Lewis

United States Patent Office 3,154,959
Patented Nov. 3, 1964

3,154,959
VARIABLE SPEED DRIVE
Bernhard N. Palm, Newport Beach, Calif., assignor to Electra Motors, Inc., Anaheim, Calif., a corporation of California
Filed Aug. 27, 1962, Ser. No. 219,390
4 Claims. (Cl. 74—230.17)

The present invention has to do with improvements in the type of variable speed drive shown in the patent of Paul K. Beemer, No. 2,893,253, July 7, 1959. Characteristic improvements of the present invention relate to simplification of the manual speed change mechanism with elimination of looseness or backlash, and reduction of the manual effort necessary to effect speed change. Those and other characteristic improvements, including mountings of the driving springs, which press one side of the V-sheaves, to provide for positive disengagement at a relatively fixed and non-varying overload, and non-freezing bearings and free movement for the movable sheave parts, will appear from the following description of a typical and illustrative embodiment of the invention, reference being had to the accompanying drawings where:

FIG. 1 is a longitudinal sectional view of such typical embodiment;

FIG. 2 is an enlarged section on line 2—2 of FIG. 1; and

FIG. 3 is an enlargement of a portion of FIG. 1.

The drawings are to scale for a drive mechanism adapted to transmit ¾ H.P., powered by a motor of that rating at 1800 r.p.m. Certain typical figures given below are for a mechanism of that rating and speed; and the actual size of the mechanism shown here may be measured from the drawings by assuming the shaft diameter at A in FIG. 1 to be three-quarters of an inch.

The housing of driving motor 10 is secured to main transmission housing 12 in any suitable manner, and motor shaft 14 is coupled at 16 with the co-axial drive shaft 18 of the transmission. Shaft 18 is mounted in bearings 20 and 22 in housing 12 and carries the two axially opposed conical faced halves 24 and 26 of a V-belt sheave. Sheave half 24 is rigidly mounted on shaft 18, as by force fitting over flutes 28. Sheave half 26 is carried on shaft 18 by bearing sleeve 30 of a self lubricating material such as a carbon-graphite cast under pressure into the hub 27 of 26. Shaft 18 is chromium plated to resist corrosion; the result is that sheave member 26 is always freely movable both axially and rotatively on the shaft.

Driven shaft 36, mounted in bearings 38 and 40, is likewise chromium plated and its freely movable sheave member 42 is mounted on the shaft with a similar self-lubricating bearing sleeve 44. The fixed sheave member 46 also may be force fitted over splines 48.

Both movable sheave members 26 and 42 are drivingly connected with their shafts solely through the coiled springs shown at 50 and 52, the spring end coils seating in annular V-groove formations connected with the respective shafts 18 and 36 and with the movable sheave members 26 and 42. Reference is first had particularly to FIGS. 2 and 3, to describe those spring connections.

As shown in those figures, a driving seat member 60 is rotatably connected with shaft 18 by a pin 62 and also held by that pin from movement on the shaft to the right by pressure of spring 50. Seat member 60 has an annular V-shaped groove 64 with its walls making an included angle of about 20°. The groove may be either press-formed or machined. The radial width of the groove is such that the end coil 50a of the spring wedges, but does not bottom, in the groove, as shown in FIG. 3. The inner wall of the groove has an inwardly extending notch 66, open at the grooved face of 60, and the extreme end of the coil is bent inwardly as shown at 51 in FIG. 2 to enter such notch. The bent end is preferably squared to fit flatly against the flat wall of the notch. As shown in FIG. 2 the notch walls are divergent outwardly. The body of spring 50 is of round tempered steel 0.148 inch diameter for this size transmission.

The other end coil of the spring seats in another driving seat 70, a duplicate of the seat member 60 except that seat 70 is keyed onto hub 27 of sheave member 26 and backs up, to the left in FIG. 3, against the inner race 72 of a thrust bearing 74, that race shouldering on the hub as shown. That other spring end coil—to the left in FIG. 3—wedge-fits into the seat groove and has its bent end 51 in a notch 66 just as described for the right-hand end of the spring. The function of spring 50 is to urge sheave member 26 toward member 24, and, normally, by spring transmitted torque, to rotatively drive the member 26.

Spring 52 on the driven shaft 36 is mounted on that shaft and on driven sheave member 42 in essentially the same manner as described for the driving spring 50. Spring 52 seats at its left end in the grooved and notched seat member 72, which is or may be a duplicate of seat member 60 and fixedly mounted on shaft 36. The right hand end of spring 52 seats directly on a grooved and notched formation 74 formed in the outer face of sheave member 42. The groove and notch formations at 72 and at 74 in the outer face of sheave member 42 are the same as described for seat member 60, and bent spring ends engage notches in those formations also as described for 60. Spring 52 is heavier than spring 50, the diameter of its tempered spring wire being 0.156 inch.

The drive ratio from driving shaft 18 to driven shaft 36 is varied by forcing the driving sheave member 26 toward 24; or by releasing the pressure of spring 50 on 26 to allow it to move away from 24—in effect, by moving 26 away from 24. V-belt 76 accommodates itself to the movements of 26 and forces or allows corresponding movements of 42 to drivingly engage the two sheaves at adjusted pitch diameters. Those movements of 26 are effected by the adjustment mechanism shown in the drawings.

The outer race 80 of thrust bearing 74 is rigidly carried in the inner end of a circular walled shell 82 which at its outer end has a circular bearing ring 84 that rides movably in the circular wall 86 of a sub-case 88 secured to main casing 12. As shown in the drawings, shell 82 has a longitudinally extending raised portion 90 carrying rack teeth 92 meshed by pinion 94 on a shaft 96 that carries indicator pointers 98 on its ends exterior of the casing. Pinion 94 is in turn meshed by worm 100 on the inner end of a manual wheel shaft 102. The teeth of pinion 94 are skewed to fit closely into worm 100, and rack teeth 92 are likewise fitted tightly into the pinion teeth, to completely eliminate any back-lash looseness between the hand wheel and sheave member 26. The pitch of worm 100 is self locking. As will be noted from FIG.

2, the raised rack portion 90 of shell 82 has clearance inside the casing walls 87 that enclose pinion 94, leaving shell 82 to be guided solely by the flat engagement of the pinion with the rack 92. As shown in the drawings rack 92 lies in a flat plane tangential of the circumference of shell 82 and its bearing ring 84 and parallel to the axes of those members. Pinion 94 with its skewed teeth is cylindric in form with its axis on that of shaft 96 transverse of the axial extent of the flat rack formation 92. Engagement of that rack by the pinion consequently holds shell 82 from rotation about the axis of shaft 18 and thus prevents shell 82 and the connected sheave member 26 from being moved axially by rotation of the skewed rack teeth in engagement with the skewed teeth of pinion 94.

It is noted, as a modification, that worm 100 and worm shaft 102 with its hand wheel may be arranged on a horizontal axis over rack 92, with the worm directly engaging the rack teeth. However, the arrangement illustrated has the advantage of holding the rack formation against rotation about the axis of 82 and 84.

The axial thrust exerted by spring 50 on its seats is relatively small as compared with that of spring 52. However the initial compression of spring 50 serves to exert some thrust on its seats, and its thrust reduces the manual effort necessary on the hand wheel to force sheave member 26 to the left and force belt 76 out to a larger pitch diameter. Due to the smaller thrust of 50 on its seats, its bent ends 51 are first to pull out of their seat notches 66 in the event of overload; and the overload torque at which one or both ends 51 pull out to take overload off the driving motor is adjustably set by the compression thrust of 50.

Reference is here had to FIGS. 2 and 3. Due to the tapered wall formation of the notch at 66 spring end 51 pulls out of that notch whenever the torque increases to a point sufficient to force the spring end 50a outwardly. To force that end outwardly it must, in FIG. 3, be moved to the left in a direction outward of the tapered seat groove formation 64. The outward force on 50a necessary to do that depends on the axial compression thrust of the spring, given any particulars of the taper of notch 66 and of the spring seat groove. The torque point at which the spring drive of the sheave member releases is consequently positive and does not depend on the frictional engagement of the spring end turn in its seat groove. That friction, as for instance in the Beemer design, may vary greatly due to changing surface conditions of the frictionally engaging parts.

Typical figures for the spring thrusts in a transmission of the rating and speed noted, are as follows.

At high speed for the driven shaft 36 with the belt at maximum pitch diameter on sheave 24, 26, and at minimum on sheave 42, 46, the thrust of spring 50 is approximately 14 pounds and that of spring 52 is about 46 pounds. With the drive at one-to-one ratio with the belt at equal pitch diameters on both sheaves, the thrust of 50 is about 20 pounds; that of 52, about forty-two pounds. At low speed with the belt at minimum pitch diameter on sheave 24, 26 and maximum on sheave 42, 46, the thrust of 50 is about 26 pounds, that of 52 is about 33 pounds. The spring rate of 50 is 16 pounds per inch, while that of 52 is 14.7 pounds per inch, spring 52 being heavier than spring 50.

I claim:

1. In a variable speed V-belt drive of the type described and embodying a driving shaft, a driven shaft, V-sheave halves mounted on each shaft, at least one sheave half being mounted on its respective shaft for free relative rotation and axial translation, and coiled helical springs exerting axial thrusts on each free sheave half tending to move those halves on their respective shafts toward their respective other halves;

the combination of a spring seat member affixed to at least one of said shafts, a spring seat member affixed to the free sheave half that is on said one shaft, the spring seated on said spring seat members forming the driving torque connection between said one shaft and its associated free sheave half, at least one of said spring seat members having an annular groove co-axial with the shaft and with walls defining a tapered groove section in a radial plane, said groove taking an end of the associated spring, the taper of said groove contracting in the direction of axial thrust of said spring, a notch in one wall of said annular groove extending radially from said wall and having at least one notch wall extending in a direction toward said groove wall and acutely angled in that direction away from a line radial with respect to the groove axis, the spring end having a radially extending end portion entering said notch, and the groove wall opposite said one groove wall being conical in form with its conical elements at an acute angle to the groove axis, said angle opening in an axial direction opposite to the direction of axial spring thrust, whereby excessive driving torque forces said spring end radially against said opposite wall of the annular groove and tends to move that spring end against the direction of spring thrust to allow the radially extending portion of the spring end to move out of said notch.

2. The combination defined in claim 1 and in which said one groove wall from which said notch extends radially is the inner wall of said groove and said opposite groove wall is the outer groove wall.

3. The combination defined in claim 1 and also including means for axially moving said free sheave half comprising, a substantially cylindrical shell on an axis concentric with the shaft axis and connected at one axial end for axial movement with said free sheave half but allowing relative rotation between it and said sheave half, means guiding said cylindric shell for axial movement but allowing rotative movement about the axis of the shell, a rack formation carried exteriorly by said shell, said rack formation extending axially of the shell and lying in a flat plane tangential and axial of said shell and having skewed rack teeth, a pinion on a fixed axis transverse of the axial extent of the rack formation, said pinion being substantially cylindric and having skewed teeth meshing with the rack teeth across the tangential dimension of the latter, and a helically toothed rotatable worm of self locking pitch on a fixed axis engaging the skewed teeth of the pinion, whereby said worm holds the pinion against rotation about its axis and the pinion holds the rack formation and the cylindric shell against rotation about the axis of the latter.

4. In a variable speed V-belt drive of the type described and embodying a driving shaft, a driven shaft, V-sheave halves mounted on each shaft, at least one sheave half being mounted on its respective shaft for free relative rotation and axial translation, and springs exerting axial thrusts on each free sheave half tending to move those halves on their respective shafts toward their respective other halves;

the combination of means for axially moving at least one of said free sheave halves comprising a substantially cylindrical shell on an axis concentric with the shaft axis and connected at one axial end for axial movement with said free sheave half but allowing relative rotation between it and said sheave half, means guiding said cylindric shell for axial movement but allowing rotative movement about the axis of the shell, a rack formation carried exteriorly by said shell, said rack formation extending axially of the shell and lying in a flat plane tangential and axial of said shell and having skewed rack teeth, a pinion on a fixed axis transverse of the axial extent of the rack formation, said pinion being substantially cylindric and having skewed teeth meshing with the rack teeth across the tangential dimension of the latter, and a helically toothed rotatable worm of self locking pitch on a fixed axis engaging the skewed teeth of the pinion, whereby said worm holds the pinion against rotation about its axis and the pinion holds the rack formation and the cylindric shell against rotation about the axis of the latter.

References Cited in the file of this patent

UNITED STATES PATENTS

| | | |
|---|---|---|
| 2,184,394 | Moretti | Dec. 26, 1939 |
| 2,487,980 | Otto | Nov. 15, 1949 |
| 2,892,253 | Beemer | July 7, 1959 |
| 2,927,470 | Heyer | Mar. 8, 1960 |